US011068663B2

(12) United States Patent
Kota et al.

(10) Patent No.: US 11,068,663 B2
(45) Date of Patent: Jul. 20, 2021

(54) SESSION EMBEDDINGS FOR SUMMARIZING ACTIVITY

(71) Applicant: Microsoft Technology Licensing, LLC, Redmond, WA (US)

(72) Inventors: Nagaraj Kota, Bangalore (IN); Venkatesh Duppada, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 16/446,349

(22) Filed: Jun. 19, 2019

(65) Prior Publication Data

US 2020/0401661 A1 Dec. 24, 2020

(51) Int. Cl.
*G06F 17/00* (2019.01)
*G06F 40/30* (2020.01)
*G06F 16/9535* (2019.01)
*G06N 20/00* (2019.01)
*G06Q 10/10* (2012.01)
*G06F 16/2457* (2019.01)

(52) U.S. Cl.
CPC ........ *G06F 40/30* (2020.01); *G06F 16/24578* (2019.01); *G06F 16/9535* (2019.01); *G06N 20/00* (2019.01); *G06Q 10/1053* (2013.01)

(58) Field of Classification Search
CPC .............. G06F 40/30; G06F 16/9535; G06F 16/24578; G06F 40/284; G06N 20/00; G06Q 10/1053
USPC .......................................................... 704/9
See application file for complete search history.

(56) References Cited

U.S. PATENT DOCUMENTS

| 2018/0121787 | A1* | 5/2018 | Hashimoto | G06F 40/253 |
| 2018/0268298 | A1* | 9/2018 | Johansen | G06F 40/30 |
| 2020/0279017 | A1* | 9/2020 | Norton | G06F 16/36 |
| 2020/0342316 | A1* | 10/2020 | Shazeer | G06N 3/08 |
| 2020/0372117 | A1* | 11/2020 | Han | G06F 40/51 |

OTHER PUBLICATIONS

Ahmad, et al., "Multi-Task Learning for Document Ranking and Query Suggestion", In Proceedings of 6th International Conference on Learning Representations, Apr. 30, 2018, pp. 1-14.
Chen, et al., "Large-scale behavioral targeting", In Proceedings of the 15th ACM SIGKDD international conference on Knowledge discovery and data mining, Jun. 28, 2009, pp. 209-217.

(Continued)

*Primary Examiner* — Charlotte M Baker
(74) *Attorney, Agent, or Firm* — Schwegman Lundberg & Woessner, P.A.

(57) ABSTRACT

The disclosed embodiments provide a system for processing data. During operation, the system obtains a first sentence representing a first sequence of actions between a user and a set of jobs. Next, the system applies a language model to token embeddings of a first set of tokens in the first sentence and position embeddings of token positions in the first sentence to produce a first set of output embeddings. The system then combines the first set of output embeddings into a first session embedding that encodes the first sequence of actions. Finally, the system outputs the first session embedding for use in characterizing job-seeking activity of the user.

20 Claims, 4 Drawing Sheets

(56) References Cited

OTHER PUBLICATIONS

Devlin, et al., "BERT: Pre-training of Deep Bidirectional Transformers for Language", In Journal of Computing Research Repository, Oct. 2018, 14 Pages.

Li, et al., "Modeling Impression Discounting in Large-scale Recommender Systems", In Proceedings of the 20th ACM SIGKDD international conference on Knowledge discovery and data mining, Aug. 24, 2014, 10 Pages.

Quadrana, et al., "Sequence-Aware Recommender Systems", In Journal of ACM Computing Surveys, vol. 51, Issue 4, Sep. 2018, 36 Pages.

* cited by examiner

SESSION EMBEDDINGS FOR SUMMARIZING ACTIVITY

BACKGROUND

Field

The disclosed embodiments relate to sequence modeling. More specifically, the disclosed embodiments relate to techniques for generating session embeddings for summarizing activity.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for modeling sequences of activity. For example, an activity sequence includes an ordered sequence of actions performed by a user over one or more sessions with an online system such as a job search tool and/or employment site. Such actions include, but are not limited to, job searches, job impressions, job clicks, and/or job applications by the user. In another example, an activity sequence includes searching, browsing, purchasing, and/or checkout activity between a user and an e-commerce platform.

More specifically, the disclosed embodiments provide a method, apparatus, and system for modeling sequences of activity as session embeddings. A language model is trained using documents representing sequences of activity for different users. Each document includes one or more sentences, with each sentence describing one or more user actions with a module, feature, tool, and/or system. For example, each document inputted into the language model includes a window of user sessions and/or actions with a job search tool. Each sentence in the document includes one or more actions performed by the user within the window. Each action is represented in the sentence by attributes such as an action type (e.g., view, click, save, apply, search, reject, etc.), parameters of an action that includes a job search, a job ID of a job to which a non-search action applies, a company associated with the job, a title of the job, a location of the job, and/or keywords from the job's description.

To train the language model, a portion of tokens in each document is masked, and parameters of the language model are updated so the language model learns to predict the masked tokens. For example, the language model includes a bidirectional transformer encoder. Input into the language model includes an embedding of each token in a sentence or document, which is summed with an embedding of the token's position in the sentence or document and an embedding of the segment (e.g., sentence) containing the token. The input also includes a classification token and a separator token that denotes the end of each segment and/or the boundary between consecutive segments in the document. During training, weights in layers of the bidirectional transformer encoder are updated so that vectors in the final hidden layer of the encoder can be used to predict masked tokens in the input. The weights are further updated so that the encoder predicts if the next sentence following a given sentence in a document.

The trained language model is then used to generate embedded representations of additional user sessions, which can be used to perform subsequent prediction or inference related to the users and/or sessions. Continuing with the above example, a sentence representing a session is inputted into the bidirectional transformer encoder, and the embedding of the session is obtained as a vector containing the final hidden state produced by the encoder from the classification token in the inputted sentence. Multiple embeddings for multiple consecutive user sessions are optionally combined into a single embedding (e.g., using a max pooling operation, recurrent neural network, long short-term memory (LSTM) network, etc.) that encodes all activities in the set of user sessions. The embedding is inputted into a classification layer and/or another machine learning model that predicts the next query by the user and/or the next job associated with a given action or outcome for the user (e.g., apply, click, receiving a response to an application, etc.), and the prediction is used to generate recommendations of query parameters and/or jobs for the user.

By representing sequences of activity within and/or across user sessions as sentences and using a language model to generate embeddings from the sentences, the disclosed embodiments convert sequences of variable numbers or types of activities and/or tokens in the sentences into fixed-length vector representations. The vectors can then be inputted into machine learning models that accept a fixed set of inputs, which allows inference to be performed based on a comprehensive and/or short-term history of activities in the sequences and/or sessions. When scores outputted by the machine learning models are used to generate recommendations and/or search results to users, the users are able to perform subsequent activities (e.g., searching for, viewing, and/or applying to relevant jobs) more efficiently and/or effectively than if the recommendations and/or search results were generated without the embeddings.

In contrast, conventional techniques generate embeddings of individual data points in a sequence and calculate a final embedding for the sequence as an average or other aggregation of the embeddings of the data points. Such aggregation can be lossy (e.g., multiple sets of embeddings can produce the same average vector) and/or fail to account for ordering of the data points within the sequence (e.g., two different sequences of the same data points produce the same average vector). In addition, embeddings for heterogeneous data points (e.g., data points from different features, modules, services, applications, etc.) reflect the context in which each data point is generated and/or the terms used to generate the embeddings. In these instances, an assumption of homogeneity across the data points cannot be maintained, and conventional aggregations of the embeddings fail to adequately capture the semantic context of the data points. In turn, machine learning models that perform inference using the aggregated embeddings may have lower performance and/or accuracy than machine learning models that perform inference using the session embeddings generated using the disclosed embodiments. Consequently, the disclosed embodiments improve computer systems, applications, user experiences, tools, and/or technologies related to sequence modeling, language modeling, feature engineering, user recommendations, search relevance, employment, recruiting, and/or hiring.

Session Embeddings for Summarizing Activity

Figure 1:
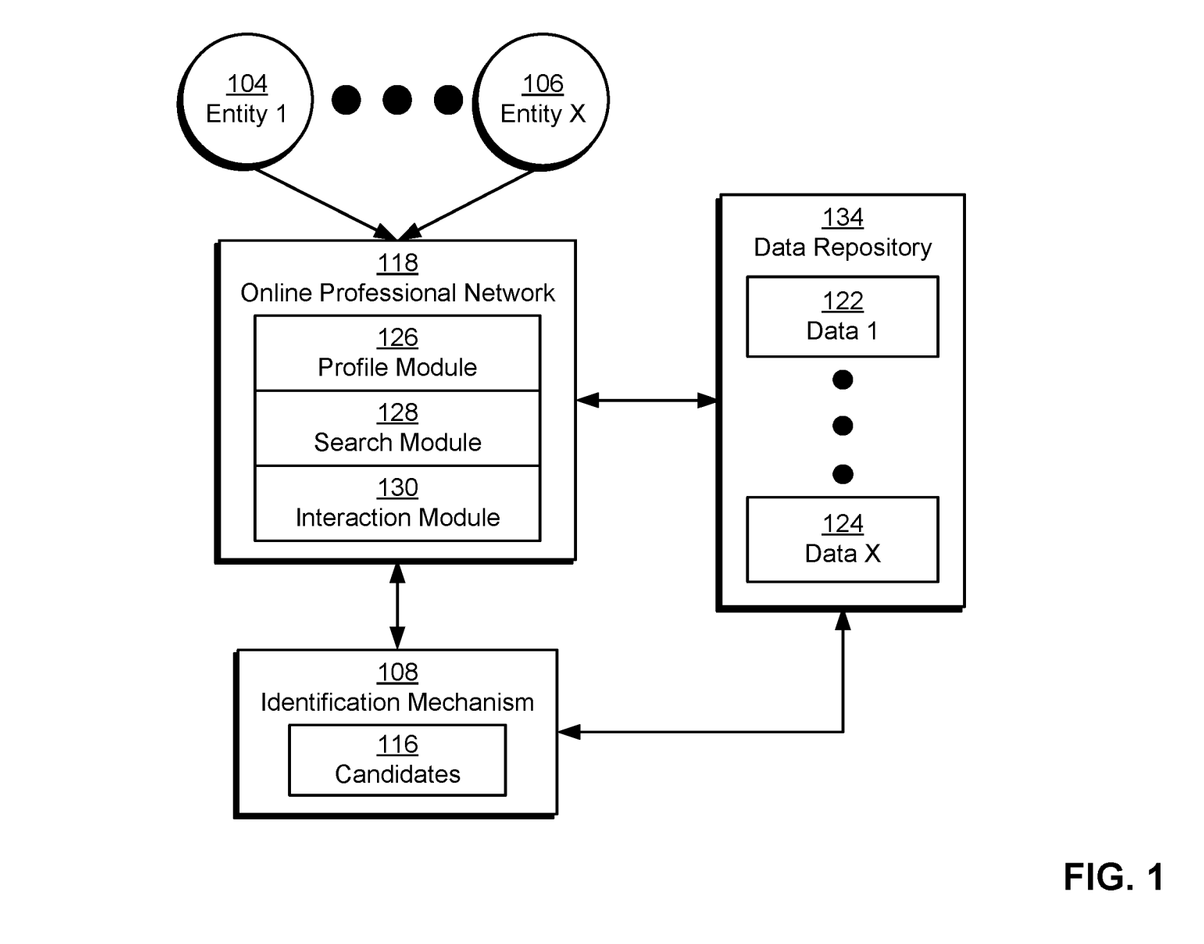
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 is inputted into the machine learning model(s), along with features and/or characteristics of the corresponding opportunities (e.g., required or desired skills, education, experience, industry, title, etc.). In turn, the machine learning model(s) output scores representing the strengths of candidates 116 with respect to the opportunities and/or qualifications related to the opportunities (e.g., skills, current position, previous positions, overall qualifications, etc.). For example, the machine learning model(s) generate scores based on similarities between the candidates' profile data with online network 118 and descriptions of the opportunities. The model(s) further adjust the scores based on social and/or other validation of the candidates' profile data (e.g., endorsements of skills, recommendations, accomplishments, awards, patents, publications, reputation scores, etc.). The rankings are then generated by ordering candidates 116 by descending score.

In turn, rankings based on the scores and/or associated insights improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may output a ranking of candidates for a given set of job qualifications as search results to a recruiter after the recruiter performs a search with the job qualifications included as parameters of the search. In a fourth example, the component(s) may recommend jobs to a candidate based on the predicted relevance or attractiveness of the jobs to the candidate and/or the candidate's likelihood of applying to the jobs.

Figure 2:
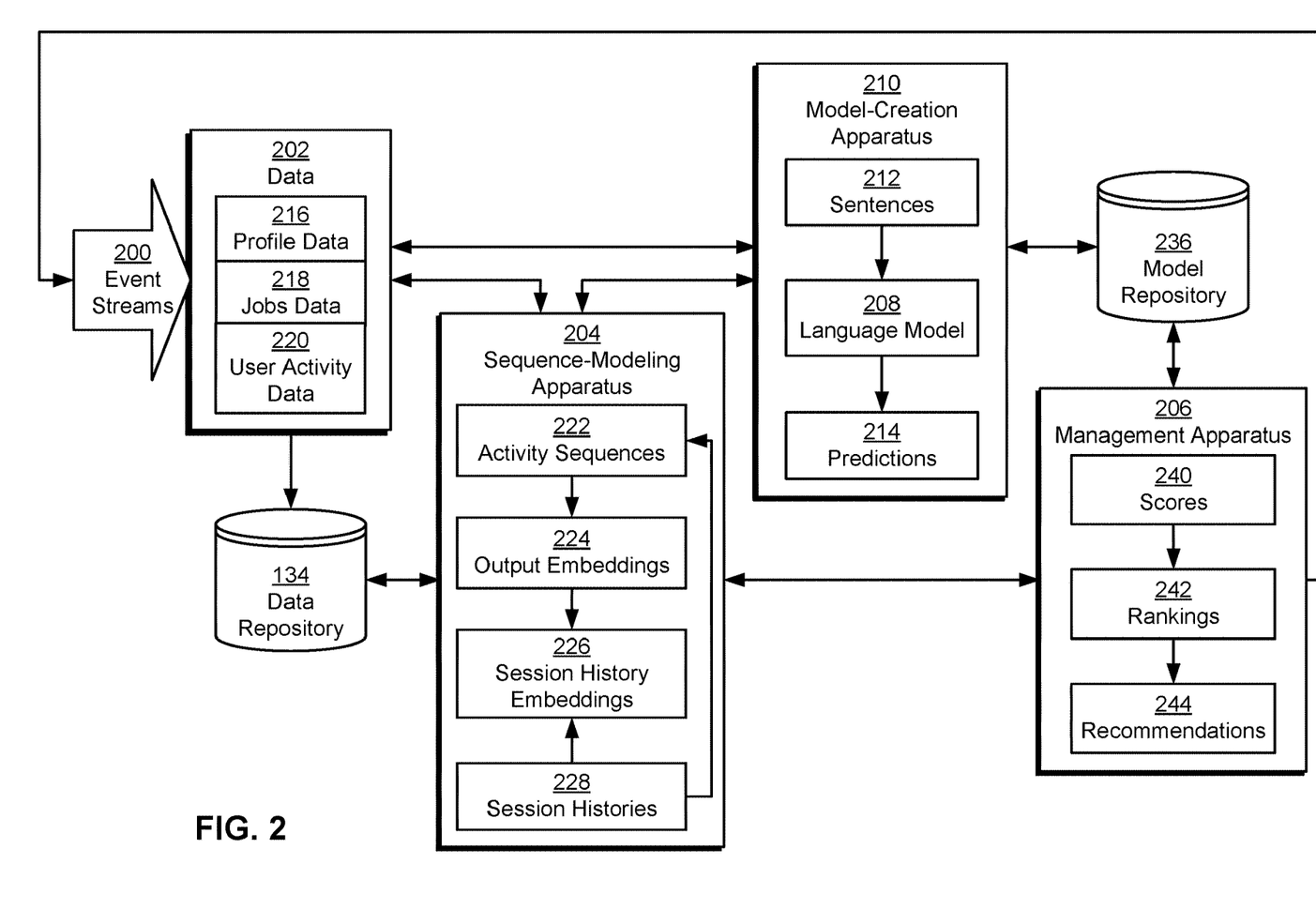
FIG. 2 shows a system for processing data in accordance with the disclosed embodiments.

In one or more embodiments, online network 118 includes functionality to improve the timeliness, relevance, effectiveness, and/or accuracy of recommendations, rankings, and/or search results outputted to the candidates. As shown in FIG. 2, data repository 134 and/or another primary data store are queried for data 202 that includes profile data 216 for members of an online system (e.g., online network 118 of FIG. 1), jobs data 218 for jobs that are listed or described within or outside the online system, and/or user activity data 220 that tracks the members' activity within and/or outside the online system.

Profile data 216 includes data associated with member profiles in the platform. For example, profile data 216 for an online professional network includes a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 also includes a set of groups to which the user belongs, the user's contacts and/or connections, awards or honors earned by the user, licenses or certifications attained by the user, patents or publications associated with the user, and/or other data related to the user's interaction with the platform.

Attributes of the members are optionally matched to a number of member segments, with each member segment containing a group of members that share one or more common attributes. For example, member segments in the platform may be defined to include members with the same industry, title, location, and/or language.

Connection information in profile data 216 is optionally combined into a graph, with nodes in the graph representing entities (e.g., users, schools, companies, locations, etc.) in the platform. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

Jobs data 218 includes structured and/or unstructured data for job listings and/or job descriptions that are posted and/or provided by members of the online system. For example, jobs data 218 for a given job or job listing include a declared or inferred title, company, required or desired skills, responsibilities, qualifications, role, location, industry, seniority, salary range, benefits, and/or member segment.

User activity data 220 includes records of user interactions with one another and/or content associated with the platform. For example, user activity data 220 tracks impressions, clicks, likes, dislikes, shares, hides, comments, posts, updates, conversions, and/or other user interaction with content in the platform. User activity data 220 also, or instead, tracks other types of activity, including connections, messages, job applications, job searches, recruiter searches for candidates, interaction between candidates 116 and recruiters, and/or interaction with groups or events. In some embodiments, user activity data 220 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 220 additionally includes schedules, calendars, and/or upcoming availabilities of the users, which may be used to schedule meetings, interviews, and/or events for the users. Like profile data 216, user activity data 220 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, profile data 216, jobs data 218, user activity data 220, and/or other data 202 in data repository 134 is standardized before the data is used by components of the system. For example, skills in profile data 216 and/or jobs data 218 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform such as Apache Kafka (Kafka™ is a registered trademark of the Apache Software Foundation). One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

In one or more embodiments, profile data 216, jobs data 218, and/or user activity data 220 are used to construct activity sequences 222 associated with user sessions between members and one or more components of the online system. Each activity sequence includes a sequence of actions performed by a member within a user session and/or across one or more sessions. For example, a job-seeking session is defined as a period of user interaction with a job search module, job recommendation module, a "jobs homepage," job listings, and/or other job-related portions of the online system. The job-seeking session starts when the member first navigates to a job-related portion of the online system and continues while the member searches for, browses, clicks, views, saves, applies to, rejects, and/or otherwise interacts with jobs in the online system. The job-seeking session ends when the member logs off the online system and/or does not engage in job-related activity for more than a pre-defined period (e.g., 30 minutes).

Sequence-modeling apparatus 204 and/or another component of the system generate activity sequences 222 based on data 202 in data repository 134 and/or events received over event streams 200. For example, the component analyzes event streams 200 containing records of job-related activity to identify a set of job-related actions that fall under a given session. The component then creates an activity sequence for the session, which includes an ordering of the actions by timestamp. Each action in the activity sequence is represented using a set of attributes, which include an action type such as a job search, view, click, apply, reject, and/or save. The attributes optionally include a job identifier (ID) of a job to which the action is applied; if the action type specifies a job search, the job ID is omitted. Similarly, the attributes optionally include a search term inputted by the user during a job search; if the action type does not specify a job search, the search term is omitted. The attributes further include a job title, company name, job location, and/or other keywords related to the job.

In one or more embodiments, sequence-modeling apparatus 204 obtains and/or generates activity sequences 222 as sentences 212 describing the actions in activity sequences 222. An example sentence representing an activity sequence includes the following:

VIEW 123456 LinkedIn::Marketing Partner,
Canada##JOB_SEARCH Digital Marketing CA##VIEW 162534
XYZ Group::Marketing Director, Innovation ##APPLY 162534 Farber Group::Marketing Director,
Innovation##JOB_SEARCH Head Of Digital CA The example activity sequence above includes five actions performed by a member during a session. Within the sentence, the actions are separated by the "##" characters. The first action includes a view of a job with a job ID of 123456, a company of "LinkedIn," and a title of "Marketing Partner, Canada." The second action includes a job search with a search term of "Digital Marketing CA." The third action includes a view of a job with a job ID of 162534, a company of "XYZ Group," and a title of "Marketing Director, Innovation." The fourth action includes an application to the job viewed in the third action. The fifth action includes a job search with a search term of "Head of Digital CA."

Next, sequence-modeling apparatus 204 generates output embeddings 224 from activity sequences 222. More specifically, sequence-modeling apparatus 204 inputs a sentence representing each activity sequence into a language model 208 and obtains output embeddings 224 as corresponding output from language model 208.

A model-creation apparatus 210 creates a language model 208 from sentences 212 that represent a sample set of activity sequences 222 in data 202. For example, language model 208 includes a Bidirectional Encoder Representations from Transformers (BERT) model and/or another type of bidirectional transformer encoder. Input into the BERT model includes embedded and/or encoded representations of tokens in sentences 212, positions of the tokens in sentences 212, ordinal sequences of segments or sentences 212 in the same input, separators between tokens in different sentences 212, and/or a classification token that is used to generate an aggregate output representation of each input into the BERT model.

Consider the following example raw input string: "JOB_SEARCH software engineer##VIEW 456762 Google::Software Engineer, UX##VIEW 927409 LinkedIn::Senior Software Engineer, New York##APPLY 927409 LinkedIn::Senior Software Engineer, New York." The input string includes a sequence of actions performed over a session. This raw session input is transformed into an intermediate representation of "software engineer c_google software engineer ux linkedin senior software engineer, new york", which is fed into the BERT model. The intermediate representation summarizes the actions without specifying the types of actions in the session, which enables robust summarization of arbitrary combinations of activities in sessions. Each session is further represented as a different segment inputted into the BERT model. Thus, a subsequent session represented by an input string of "VIEW 984657 Netflix::Software engineer##VIEW 345683 Google::Senior software engineer, Search##APPLY 345683 Google::Senior software engineer, Search" would form another segment, with the '$$' characters denoting a boundary between the two segments.

Continuing with the example input strings above, model-creation apparatus 210 adds a classification token (e.g., [CLS]) to the beginning of the input, identifies the boundary between the two segments of the input as the "SS" characters, and adds a separator token (e.g., [SEP]) between the first and second segments and after the second segment. Model-creation apparatus 210 also generates a first segment embedding for each token in the first segment (i.e., "software", "engineer", "c_google", "software", "engineer", "ux", "c_linkedin", "senior", "software", "engineer", "new york"), including the classification token and the separator token between the first and second segments, and generates a second segment embedding for each token in the second segment (i.e., "c_netflix," "software," "engineer," "c_google,", "senior", "software," "engineer," "search"), including the separator token at the end of the second segment. For each token in the input, model-creation apparatus 210 generates a separate token embedding based on the value of the token and a position embedding that enumerates the token's position in the input (i.e., the classification token has a position embedding representing an index of 0, "software" has a position embedding representing an index of 1, "engineer" has position embeddings representing indexes of 2 and 10, etc.). Finally, model-creation apparatus 210 sums the token embedding, segment embedding, and position embedding for each token into an input embedding for the token and uses input embeddings for the tokens, including the classification token and separator tokens, as input into language model 208.

During training of language model 208, model-creation apparatus 210 updates parameters of language model 208 based on differences between predictions 222 outputted by language model 208 and labels or outcomes associated with predictions 222. First, model-creation apparatus 210 masks, substitutes, and/or otherwise modifies a subset of tokens in sentences 212 inputted into language model 208 and trains language model 208 to predict the masked and/or modified tokens.

Continuing with the above example, model-creation apparatus 210 randomly selects 15% of the tokens in the input above (e.g., two tokens out of 16 tokens in the original input string) and replaces each of the selected tokens with a special [MASK] token. Model-creation apparatus 210 optionally reuses the same input string with a different random selection of 15% of the tokens so that the BERT model learns to predict different words in the input. Model-creation apparatus 210 then feeds the final hidden layer of the BERT model into an output softmax over the set of possible words in the input to the model and trains the model to generate vectors in the final hidden layer that predict the masked tokens.

Model-creation apparatus 210 also, or instead, replaces a given subset of selected tokens in the string with random tokens instead of the [MASK] token. Model-creation apparatus 210 also, or instead, keeps a certain proportion of selected token in the string instead of masking or substituting the tokens. By varying replacement of the selected tokens with [MASK] token, random words, and/or the original tokens, model-creation apparatus 210 mitigates mismatch between training of the BERT model using the [MASK] token and subsequent fine-tuning of the BERT model in a supervised downstream task that does not use or see the [MASK] token.

Second, model-creation apparatus 210 trains language model 208 to predict a next sentence in a set of sample sentences 212 from a current sentence in the same set of sample sentences 212. For example, model-creation apparatus 210 generates pairs of sentences 212 as training data to be inputted into the BERT model. A first proportion of sentence pairs (e.g., 50%) includes a second sentence that follows the first sentence in an activity sequence, and a second proportion of sentence pairs (e.g., 50%) includes a second sentence that is a random sentence from a different activity sequence instead of the sentence following the first sentence in the same activity sequence. Model-creation apparatus 210 generates a positive label of "IsNext" for the first proportion of input sentence pairs and a negative label of "NotNext" for the second proportion of input sentence pairs. Model-creation apparatus 210 then feeds the final hidden layer of the BERT model into an output layer that predicts a label from the corresponding input sentence pair and updates the parameters of the BERT model so that the predicted label reflects the assigned label.

After language model 208 is trained, model-creation apparatus 210 stores parameters of language model 208 in a model repository 236. For example, model-creation apparatus 210 replaces old values of the parameters in model repository 236 with the updated parameters, or model-creation apparatus 210 stores the updated parameters separately from the old values (e.g., by storing each set of parameters with a different version number of the corresponding model). Model-creation apparatus 210 also, or instead, provides language model 208 to sequence-modeling apparatus 204.

Sequence-modeling apparatus 204 inputs activity sequences 222 for a given user into language model 208 to produce output embeddings 224 that encode activity sequences 222 into vector representations. For example, sequence-modeling apparatus 204 generates and/or obtains a string representing an activity sequence that contains an ordered sequence of actions by the user. The actions span a session, multiple sessions, an interval of time (e.g., an hour, a day, a week), a certain number of actions (e.g., the last 10 actions performed by the user), and/or all actions performed by the user with a corresponding portion of the online system (e.g., a job-related module, another module of the online system, and/or the entire online system). Sequence-modeling apparatus 204 adds a classification token to the beginning of the sentence and/or a separator token after the end of each action and/or session in the string. Next, sequence-modeling apparatus 204 generates token embeddings, position embeddings, and/or segment embeddings for individual tokens in the string and inputs the embeddings into a BERT model. Sequence-modeling apparatus 204 then obtains an output embedding for the inputted string as the last hidden layer produced by the BERT model from the classification token embeddings. Sequence-modeling apparatus 204 also, or instead, uses a max pooling and/or other operation to aggregate vectors in the last hidden layer of the BERT model produced from individual tokens in the sentence to generate an output embedding representing the activities or actions described in the sentence.

Sequence-modeling apparatus 204 also includes functionality to combine two or more output embeddings 224 for the user into one or more session history embeddings 226 that encode one or more session histories 228 for the user. For example, sequence-modeling apparatus 204 uses a max-pooling operation to combine two or more output embeddings 224 generated by sequence-modeling apparatus 204 from different sets of actions and/or sessions for a user into a single session history embedding that represents all actions from which the output embeddings were generated. In another example, sequence-modeling apparatus 204 inputs a series of output embeddings 224 representing multiple activity sequences 222 into a recurrent neural network, long short-term memory (LSTM) network, and/or another type of sequence model to combine output embeddings 224 into a single session history embedding representing the time-ordered sessions and/or actions encoded in output embeddings 224.

Consequently, sequence-modeling apparatus 204 uses language model 208 to summarize a number of text-based activity sequences 222 for the user into encoded and/or embedded representations of session histories 228 that span one or more sessions of the user and/or the user's entire activity history. In some embodiments, session histories 228 include a short-term history of one or more of the most recent sessions by the user. Session histories 228 also, or instead, include a long-term history that includes multiple sessions by the member and/or the member's actions across all sessions. The short-term history thus captures the member's recent behavior, while the long-term history tracks changes to the member's actions over time and/or the patterns or trends in the member's intent or behavior.

After session history embeddings 226 representing one or more session histories 228 are generated for the user, sequence-modeling apparatus 204 stores session embeddings 226 and/or output embeddings 224 in data repository 134 for subsequent retrieval and use. Sequence-modeling apparatus 204 also, or instead, provides session embeddings 226 and/or output embeddings to model-creation apparatus 210, a management apparatus 206, and/or another component of the system for use in generating additional models and/or recommendations 244 using the features.

In one or more embodiments, management apparatus 206 includes functionality to generate recommendations 244 related to one or more sets of users based on session histories 228, output embeddings 224, and/or other features inputted into one or more machine learning models. For example, management apparatus 206 generates job-related recommendations 244 as search results of job searches by candidates, suggested queries for the job searches, search results of recruiters' searches for qualified candidates for specific jobs, suggested queries for the recruiters' searches, job recommendations that are displayed and/or transmitted to the candidates, and/or within other contexts related to job seeking, recruiting, careers, and/or hiring.

To generate recommendations 244, management apparatus 206 retrieves, from model repository 236 and/or model-creation apparatus 210, the latest parameters of one or more machine learning models that generate predictions related to a candidate's compatibility with a job (or attributes of the job), the likelihood that the candidate has a positive response to (e.g., clicks on, applies to, and/or saves) the job, and/or the candidate's strength or quality with respect to requirements or qualifications of the job. Next, management apparatus 206 inputs session embeddings 226 representing one or more job-seeking session histories 228 of the candidate into the machine learning model(s). Management apparatus 206 also inputs additional features, such as encodings and/or embeddings of one or more jobs and/or parameters of a job search query by the candidate, into the machine learning model(s).

Management apparatus 206 uses the model parameters and features to generate a set of scores 240 between the candidate and a set of jobs. For example, management apparatus 206 applies a logistic regression model, deep learning model, support vector machine, tree-based model, and/or another type of machine learning model to features for a candidate-job pair to produce a score from 0 to 1 that represents the probability that the candidate has a positive response or outcome to a job or query recommendation (e.g., recommendations 244) that is displayed to the candidate.

Management apparatus 206 then generates rankings 242 of the jobs or job attributes by the corresponding scores 240. For example, management apparatus 206 may rank jobs or job queries for a candidate by descending predicted likelihood of positively responding to the jobs or queries. Finally, management apparatus 206 outputs some or all jobs or queries in rankings 242 as recommendations 244 to the corresponding candidates. For example, management apparatus 206 displays some or all jobs that are ranked by a candidate's descending likelihood of applying to the jobs within a job search tool, email, notification, message, and/or another communication containing job recommendations 244 to the candidate. In another example, management apparatus 206 displays one or more of the highest ranked query recommendations 224 to the candidate while the candidate types a query into a job search module and/or otherwise interacts with the job search module. Subsequent responses to recommendations 244 may, in turn, be used to generate events that are fed back into the system and used to update activity sequences 222, output embeddings 224, session embeddings 226, session histories 228, language model 208, the machine learning models, and/or recommendations 244.

By representing activity sequences 222 within and/or across user sessions as sentences 212 and using language model 208 to generate output embeddings 224 and/or session history embeddings 226 from the sentences, the system of FIG. 2 variable numbers or types of activities and/or tokens in sentences 212 and/or activity sequences 222 into fixed-length vector representations. The vectors can then be inputted into machine learning models that accept a fixed set of inputs, which allows inference to be performed based on embedded representations of session histories 228 containing the user sessions. When scores outputted by the machine learning models are used to generate recommendations 244 and/or search results to users, the users are able to perform subsequent activities (e.g., searching for, viewing, and/or applying to relevant jobs) more efficiently and/or effectively than if the recommendations and/or search results were generated without the embeddings.

In contrast, conventional techniques generate embeddings of individual data points in a sequence and calculate a final embedding for the sequence as an average or other aggregation of the embeddings of the data points. Such aggregation can be lossy (e.g., multiple sets of embeddings can produce the same average vector) and/or fail to account for ordering of the data points within the sequence (e.g., two different sequences of the same data points produce the same average vector). In turn, machine learning models that perform inference using the aggregated embeddings may have lower performance and/or accuracy than machine learning models that perform inference using session embeddings 226. Consequently, the disclosed embodiments improve computer systems, applications, user experiences, tools, and/or technologies related to sequence modeling, language modeling, feature engineering, user recommendations, search relevance, employment, recruiting, and/or hiring.

Those skilled in the art will appreciate that the system of FIG. 2 may be implemented in a variety of ways. First, sequence-modeling apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Sequence-modeling apparatus 204, model-creation apparatus 210, and management apparatus 206 may additionally be implemented together and/or separately by one or more hardware and/or software components and/or layers. Sequence-modeling apparatus 204, model-creation apparatus 210, and/or management apparatus 206 may further execute in an offline, online, and/or on-demand basis to accommodate requirements or limitations associated with the processing, performance, or scalability of the system; the availability of activity sequences 222 for candidates; and/or recent job-seeking activity by candidates (e.g., user sessions, job searches, job views, clicks on jobs, applications for jobs, etc.).

Second, a number of models and/or techniques may be used to generate activity sequences 222, output embeddings 224, session embeddings 226, scores 240, and/or rankings 242. For example, the functionality of language model 208 may be provided by a Large-Scale Information Network Embedding (LINE), principal component analysis (PCA), latent semantic analysis (LSA), word embedding model, transformer model, deep learning model, and/or other technique that generates a low-dimensional embedding space from documents and/or terms. Multiple versions of language model 208 may also be adapted to different subsets of candidates (e.g., different member segments in the community), jobs, activities, and/or attributes, or the same language model 208 may be used to generate output embeddings 224 and/or session embeddings 226 for all candidates, jobs, and/or job sequences.

Third, the system of FIG. 2 may be adapted to different types of features. For example, language model 208 may be used to generate output embeddings 224, session embeddings 226, and/or other features related to awards, publications, patents, group memberships, profile summaries, educational background, courses of study, acquisition of skills, web browsing activities, chat histories, and/or other attributes that can be ordered by time and/or grouped under users or other entities.

Figure 3:
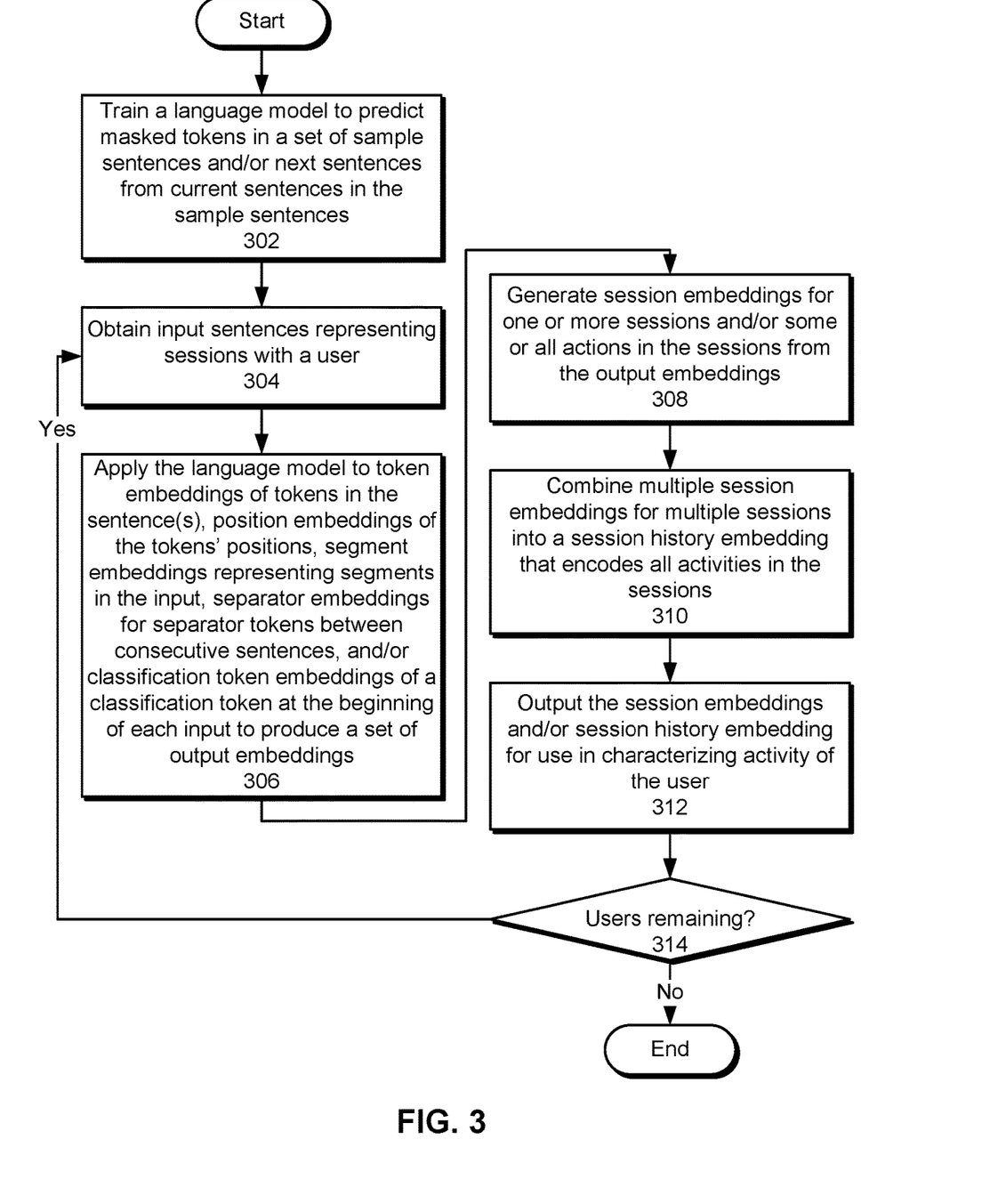
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a language model is trained to predict masked tokens in a set of sample sentences and/or next sentences from current sentences in the sample sentences (operation 302). For example, the language model includes a BERT model and/or bidirectional transformer encoder, and the sample sentences include activity sequences that describe attributes of time-ordered actions performed by users. Pairs of sentences are selected as input into the model; half of the input sentence pairs include a second sentence that follows the first sentence in an activity sequence or user session, and the other half of the input sentence pairs include a second sentence that is a random sentence from a different activity sequence or user session. A proportion of tokens in the inputted sentences is also randomly replaced with a [MASK] token and/or another random token. The inputted sentences are used to train the model so that the model predicts the masked tokens and/or distinguishes between a second sentence in the input that follows the corresponding first sentence in an activity sequence and a second sentence in the input that does not follow the corresponding first sentence in an activity sequence.

Next, input sentences representing sessions with a user are obtained (operation 304). For example, each sentence includes tokens describing one or more actions performed by the user in a job-seeking (or other) context. The tokens include, but are not limited to, an action type (e.g., search, view, click, apply, reject, save, etc.) of an action, a job ID of a job to which the action pertains, a title of the job, a company of the job, a location of the job, a search term inputted using a job search action, and/or a keyword from a description of the job.

The language model is applied to token embeddings of tokens in the sentence(s), position embeddings of token positions in the sentence(s), segment embeddings representing segments in the input, separator embeddings for separator tokens between consecutive sentences, and/or classification token embeddings of a classification token at the beginning of each input to produce a set of output embeddings (operation 306). For example, one or more sentences describing one or more sequences of actions performed by the user over time are obtained as input into the language model. A classification token is added to the beginning of the input, and a separator token is added to the end of each segment (e.g., action, session, etc.) in the input. For each token in the input, a token embedding of the token's value is generated, along with a position embedding representing the token's position in the input and a segment embedding representing the ordinal position of the segment (e.g., sentence) in the input to which the token belongs. The token embedding, position embedding, and segment bedding for every token are inputted into the model, and a set of output embeddings are obtained as values of the last hidden layer of the language model produced from the input embeddings.

Session embeddings for one or more sessions and/or some or all actions in the sessions are generated from the output embeddings (operation 308). For example, a session embedding for a series of actions described in the input sentence(s) is obtained as the last hidden layer generated by the model from the classification token at the beginning of the input. In another example, a max pooling operation is used to aggregate multiple output embeddings generated from individual tokens in the input into a single session embedding that encodes all of the actions described in the input.

Multiple session embeddings for multiple sessions are further combined into a session history embedding that encodes all activities in the sessions (operation 310). For example, each session embedding includes a vector representation of a series of actions in a session. The session embeddings are ordered by the temporal sequence of the corresponding sessions, and a sequence model is applied to the ordered session embeddings to generate an aggregate session history embedding representing the short-term or long-term session history of the user. The session history embedding is also, or instead, produced by aggregating the session embeddings using a max pooling operation and/or other type of operation.

Finally, the session embeddings and/or session history embedding are outputted for use in characterizing the activity of the user (operation 312). For example, one or more session embeddings and/or the session history embedding are inputted into a machine learning model, and the machine learning model outputs a score representing a likelihood of a positive outcome between the user and an entity (e.g., job, job search query, etc.). A recommendation of the entity to the user is then generated based on a ranking of entities by score and/or by applying a threshold to the score.

Operations 304-312 may be repeated for remaining users (operation 314). For example, a separate set of output embeddings, session embeddings, and/or session history embeddings is generated for each user for which activity sequences are collected. The embeddings are stored, inputted into a machine learning model, and/or otherwise used to characterize and/or predict the user's behavior, intent, and/or preferences with respect to jobs and/or other entities with which the user interacts.

Figure 4:
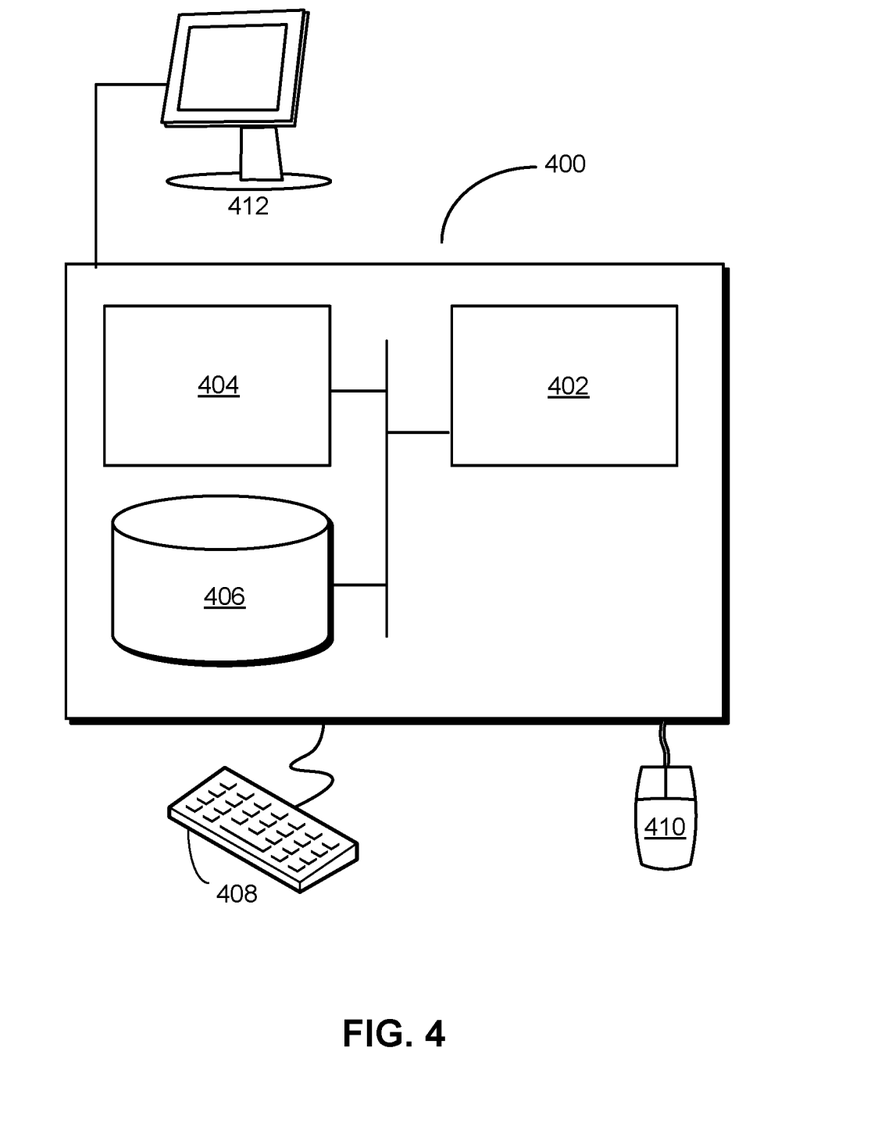
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a sequence-modeling apparatus, a model-creation apparatus, and a management apparatus, one or more of which may alternatively be termed or implemented as a module, mechanism, or other type of system component. The model-creation apparatus trains a language model to predict masked tokens in a set of sample sentences and/or next sentences from current sentences in the sample sentences. The sequence-modeling apparatus obtains a first sentence representing a first sequence of actions between a user and a set of jobs and a second sentence representing a second sequence of actions between the user and the jobs. Next, the sequence-modeling apparatus applies a language model to token embeddings of a first set of tokens in the first sentence and position embeddings of token positions in the first sentence to produce a first set of output embeddings. The sequence-modeling apparatus also applies the language model to token embeddings of a second set of tokens in the second sentence and position embeddings of token positions in the second sentence to produce a second set of output embeddings. The sequence-modeling apparatus then combines the first set of output embeddings into a first session embedding that encodes the first sequence of actions and combines the second set of output embeddings into a second session embedding that encodes the second sequence of actions. The sequence-modeling also combines the first and second session embeddings into a session history embedding representing both sessions. Finally, the management apparatus outputs the first session embedding, second session embedding, and/or session history embedding for use in characterizing job-seeking activity of the user.

In addition, one or more components of computer system 400 may be remotely located and connected to the other components over a network. Portions of the present embodiments (e.g., sequence-modeling, apparatus, model-creation apparatus, management apparatus, data repository, model repository, online network, etc.) may also be located on different nodes of a distributed system that implements the embodiments. For example, the present embodiments may be implemented using a cloud computing system that generates recommendations and/or embeddings of activity sequences for a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a first sentence representing a first session with a user and a second sentence representing a second session with the user, wherein each of the first and second sessions comprises a sequence of actions between the user and a set of jobs;
   applying, by one or more computer systems, a language model to token embeddings of a first set of tokens in the first sentence and position embeddings of token positions in the first sentence to produce a first session embedding for the first session;
   applying, by the one or more computer systems, the language model to the token embeddings of a second set of tokens in the second sentence and the position embeddings of the token positions in the second sentence to produce a second session embedding for the second session; and
   outputting the first and second session embeddings for use in characterizing job-seeking activity of the user.

2. The method of claim 1, further comprising:
   combining the first and second session embeddings into a session history embedding representing the first and second sessions.

3. The method of claim 2, wherein combining the first and second session embeddings into the session history embedding comprises:
   generating the session history embedding as an element-wise maximum of the first and second session embeddings.

4. The method of claim 2, wherein combining the first and second session embeddings into the session history embedding comprises:
   inputting the first and second session embeddings into a sequence model; and
   obtaining the session history embedding as output from the sequence model.

5. The method of claim 2, wherein combining the first and second session embeddings into the session history embedding comprises:
   identifying a subset of tokens in the first and second sentences that represent a subset of actions in the first and second sessions; and
   aggregating output embeddings generated by the language model from the subset of tokens into the session history embedding.

6. The method of claim 1, further comprising:
   obtaining a third sentence representing a third session with the user and a fourth sentence representing a fourth session with the user; and
   applying the language model to the token embeddings of a third set of tokens in the third sentence and a fourth set of tokens in the fourth sentence, a separator embedding of a separator token between the third and fourth sets of tokens, a first segment embedding for the third sentence, a second segment embedding for the fourth sentence, and the position embeddings of the token positions in the third and fourth sentences to produce a session history embedding.

7. The method of claim 1, further comprising:
   training the language model to predict at least one of:
   masked tokens in a set of sample sentences; and
   a next sentence in the set of sample sentences from a current sentence in the set of sample sentences.

8. The method of claim 1, wherein outputting the first and second session embeddings for use in characterizing the job-seeking activity of the user comprises:
   inputting the first and second session embeddings and additional features related to a job into a machine learning model;
   receiving, as output from the machine learning model, a score representing a likelihood of a positive outcome between the user and the job; and
   generating a recommendation related to the job based on the score.

9. The method of claim 8, wherein the recommendation comprises at least one of:
   a query suggestion for a job search by the user; and
   a recommendation of the job to the user.

10. The method of claim 1, wherein the first session embedding comprises an output embedding generated by the language model from a classification token inputted into the language model.

11. The method of claim 1, wherein the language model comprises a bidirectional transformer encoder.

12. The method of claim 1, wherein the first and second sentences comprise at least one of:
    an action type;
    a job identifier;
    a title;
    a company;
    a location; and
    a search term; and
    a keyword.

13. A system, comprising:
    one or more processors; and
    memory storing instructions that, when executed by the one or more processors, cause the system to:
    obtain a first sentence representing a first sequence of actions between a user and a set of jobs;
    apply a language model to token embeddings of a first set of tokens in the first sentence and position embeddings of token positions in the first sentence to produce a first set of output embeddings;
    combine the first set of output embeddings into a first session embedding that encodes the first sequence of actions; and
    output the first session embedding for use in characterizing job-seeking activity of the user.

14. The system of claim 13, wherein the memory further stores instructions that, when executed by the one or more processors, cause the system to:
    apply the language model to a second sentence representing a second sequence of actions between the user and an additional set of jobs to produce a second set of output embeddings;

combine the second set of output embeddings into a second session embedding that encodes the second sequence of actions; and combine the first and second session embeddings into a session history embedding representing the first and second sequences of actions.

15. The system of claim 14, wherein combining the first and second session embeddings into the session history embedding comprises:

inputting the first and second session embeddings into a sequence model; and obtaining the session history embedding as output from the sequence model.

16. The system of claim 13, wherein outputting the first session embedding for use in characterizing the job-seeking activity of the user comprises:

inputting the first session embedding and additional features related to a job into a machine learning model;

receiving, as output from the machine learning model, a score representing a likelihood of a positive outcome between the user and the job; and generating a recommendation related to the job based on the score.

17. The system of claim 16, wherein the recommendation comprises at least one of:

a query suggestion for a job search by the user; and a recommendation of the job to the user.

18. The system of claim 13, wherein the language model comprises a bidirectional transformer encoder.

19. The system of claim 13, wherein the first session embedding comprises an output embedding generated by the language model from a classification token inputted into the language model.

20. A non-transitory computer-readable storage medium storing instructions that when executed by a computer cause the computer to perform a method, the method comprising:

obtaining a first sentence representing a first session with a user and a second sentence representing a second session with the user, wherein each of the first and second sessions comprises a sequence of actions performed by the user with an online system;

applying a language model to token embeddings of a first set of tokens in the first sentence and position embeddings of token positions in the first sentence to produce a first session embedding for the first session, wherein the first session embedding comprises an output embedding generated by the language model from a classification token added to the first sentence;

applying the language model to the token embeddings of a second set of tokens in the second sentence and the position embeddings of the token positions in the second sentence to produce a second session embedding for the second session; and outputting the first and second session embeddings for use in characterizing activity of the user.

* * * * *